US00RE35682E

United States Patent [19]

Fields

[11] E Patent Number: Re. 35,682

[45] Reissued Date of Patent: Dec. 9, 1997

[54] FIREFIGHTER COAT WITH RESERVOIR CUFF

[75] Inventor: Ronald L. Fields, Winchester, Ky.

[73] Assignee: Lion Apparel, Inc., Dayton, Ohio

[21] Appl. No.: 438,779

[22] Filed: May 11, 1995

Related U.S. Patent Documents

Reissue of:

[64] Patent No.: 5,208,919
Issued: May 11, 1993
Appl. No.: 833,089
Filed: Feb. 10, 1992

[51] Int. Cl.[6] ..... A41B 7/00

[52] U.S. Cl. ..... 2/123; 2/81; 2/82

[58] Field of Search ..... 2/81, 82, 85, 86, 2/87, 93, 97, 123, 270, 272

[56] References Cited

U.S. PATENT DOCUMENTS

| | | | |
|---|---|---|---|
| 507,466 | 10/1893 | Van Oostom . | |
| 931,711 | 8/1909 | Hochstuhl . | |
| 2,543,317 | 2/1951 | Hammond | 2/82 |
| 2,655,663 | 10/1953 | Hoagland | 2/270 |
| 3,496,572 | 2/1970 | Herzig | 2/2 |
| 3,889,297 | 6/1975 | Jarboe et al. | 2/16 |
| 4,114,200 | 9/1978 | Smith et al. | 2/51 |
| 4,507,806 | 4/1985 | Coombs | 2/85 |
| 4,543,670 | 10/1985 | Ehring | 2/85 |
| 4,627,112 | 12/1986 | Grilliot et al. | 2/85 |
| 4,631,753 | 12/1986 | Ehring | 2/85 |
| 4,748,691 | 6/1988 | Grilliot et al. | 2/81 |
| 4,768,233 | 9/1988 | Grilliot et al. | 2/81 |
| 4,782,534 | 11/1988 | Grilliot et al. | 2/81 |
| 4,999,850 | 3/1991 | Grilliot et al. | 2/126 |
| 5,001,785 | 3/1991 | Heiman et al. | 2/123 |
| 5,054,125 | 10/1991 | Snedeker | 2/81 |
| 5,073,988 | 12/1991 | Lewis, Jr., et al. | 2/162 |
| 5,090,057 | 2/1992 | Aldridge | 2/82 |
| 5,138,717 | 8/1992 | Tolton | 2/123 |

FOREIGN PATENT DOCUMENTS 1568015 5/1980 United Kingdom .

*Primary Examiner*—Diana Biefeld
*Attorney, Agent, or Firm*—Thompson Hine & Flory LLP

[57] ABSTRACT

A firefighter coat of the type having an outer shell, a moisture barrier and a thermal barrier includes a reservoir cuff which prevents liquid moisture from entering the open sleeve end of the coat and flowing between the moisture barrier and outer shell, and between the moisture barrier and thermal barrier. The reservoir cuff includes a reservoir member which is attached by a waterproof seal to the moisture barrier sleeve and extends to the end of the thermal barrier; the connections between the reservoir member, thermal barrier and moisture barrier being permanent and waterproof. The moisture barrier sleeve extends beyond the reservoir member and is attached to the outer shell at a hem which extends about the outer end of the shell. In the preferred embodiment, the moisture barrier sleeve connection with the outer shell is removable and is effected by hook and loop fasteners, one component of which extends about the inner periphery of the moisture barrier sleeve and the complementary component of which extends about the outer periphery of a hem attached to the outer shell. The thermal barrier sleeve preferably includes a ribbed cuff which extends outwardly passed the connection with the reservoir member so that the entire length of the wearer's arm is protected by the requisite layers of material.

15 Claims, 2 Drawing Sheets

FIREFIGHTER COAT WITH RESERVOIR CUFF

Matter enclosed in heavy brackets [ ] appears in the original patent but forms no part of this reissue specification; matter printed in italics indicates the additions made by reissue.

BACKGROUND OF THE INVENTION

The present invention relates to firefighter coats and, more particularly, to firefighter coats having multiple components which are separable from each other.

In order to comply with National Fire Protection Association (NFPA) standards, firefighter coats used in the United States must include three components: an outer shell of flame resistant material, typically an aramid fiber such as NOMEX or KEVLAR (NOMEX and KEVLAR are registered trademarks of E.I. DuPont de Nemours & Co., Inc.), and an inner liner having a moisture barrier, preferably of GORE-TEX (a registered trademark of W.L. Gore & Associates, Inc.) and a thermal barrier made of a felt or batting of aramid fibers. In order to facilitate the care and laundering of such garments, the outer shell typically is separable from the inner liner combination of moisture barrier and thermal barrier. A problem with having such separable components is that liquid moisture easily enters the open sleeve ends of the coat during use and flows between the moisture barrier and thermal barrier which soaks the thermal barrier and causes discomfort to the wearer. Liquid moisture is prevented from entering directly between the wearer and the thermal barrier typically by ribbed cuffs which protrude from the sleeve ends of the thermal barrier.

Accordingly, efforts have been made to design firefighter coats which have sleeve connections between the outer shell and inner liner which discourages the flow of liquid moisture through the ends of the sleeves and between the moisture barrier and thermal barrier. One example is disclosed in Ehring U.S. Pat. No. 4,631,753. That patent discloses a firefighter coat in which the inner liner includes a wristlet assembly that attaches to the sleeve ends of the inner liner by hook and loop connections and protrudes outwardly through the open end of the shell sleeves. The outer shell includes restraining tab elements which are stitched to the cuff of the sleeve end and which attach to the inner liner by snaps. While such a construction affords some thermal and liquid moisture protection for the arms of the wearer, the hook and loop fastener connection is insufficient to prevent liquid moisture from flowing within the thermal barrier completely, and the snap connections also are less than perfect in preventing liquid moisture from flowing between the shell and moisture barrier.

Another design is disclosed in Ehring U.S. Pat. No. 4,543,670. That patent discloses a cuff and sleeve assembly in which a cuff extension attaches by snaps to the end of the inner liner and includes an inner sleeve which extends from the cuff extension to a flap formed in the hem attached to the outer shell sleeve. Such constructions tend to be overly complicated and expensive, and require increased maintenance.

Accordingly, there is a need for a firefighter coat having a reservoir cuff design which is simple in construction, inexpensive, easy to maintain and is highly effective in preventing liquid moisture from flowing up the sleeve of the wearer.

SUMMARY OF THE INVENTION

The present invention is a firefighter coat having an outer shell and a removable inner liner consisting of a moisture barrier and a thermal barrier in which each moisture barrier sleeve is attached at an outer end to the outer shell sleeve and includes a reservoir member attached to the thermal barrier sleeve. Accordingly, liquid moisture entering the sleeve openings of the coat of the present invention is prevented from flowing up the sleeves by the reservoir member, which extends between the moisture barrier and thermal barrier, so that there is a continuous moisture barrier extending between the outer shell and thermal barrier. Liquid moisture is prevented from flowing up the sleeve between the thermal barrier and the wearer's wrist by a ribbed cuff which forms an extension of the thermal barrier.

In the preferred embodiment, the inner liner is removable from the outer shell and the outer ends of the moisture barrier sleeves include one component of a fastener member which engages a complementary fastener member component formed on the peripheral lip of a hem attached to the end of the outer shell sleeve. In the preferred embodiment, the fastener member consists of strips of hook and loop material; alternately, the fastener member can be a series of snaps spaced about the hem. Since the hem includes a lip which overlies the end of the moisture barrier, the amount of liquid moisture flowing through the connection between the moisture barrier and hem is negligible.

The connection between the reservoir member and the moisture barrier is a permanent connection which is sealed to provide a moisture-tight seam. Similarly, the connection between the reservoir member and thermal barrier is permanent and also provides a water-tight seal. Consequently, it is virtually impossible for liquid moisture to flow through the seams, unlike prior art devices in which such connections are effected by hook and loop connections or snaps.

Accordingly, it is an object of the present invention to provide a firefighter coat with reservoir cuffs in which the reservoir cuffs prevent the inflow of liquid moisture up the sleeves of the coat between the outer shell and inner liner; reservoir cuffs which maintain a water-tight connection in a design in which the inner liner is removable from the outer shell; reservoir cuffs which are of a relatively simple construction and are therefore inexpensive to fabricate and maintain; a reservoir cuff design which is rugged in construction and can withstand the rigors of use in a firefighting environment; a reservoir cuff design in which the connections between the outer shell and inner liner are permanent and are sealed to prevent the seepage of liquid moisture; and a reservoir cuff design in which full protection from external heat and liquid moisture extends substantially the entire length of the coat sleeves.

Other objects and advantages will be apparent from the following description, the accompanying drawings and the appended claims.

DETAILED DESCRIPTION

Figure 1:
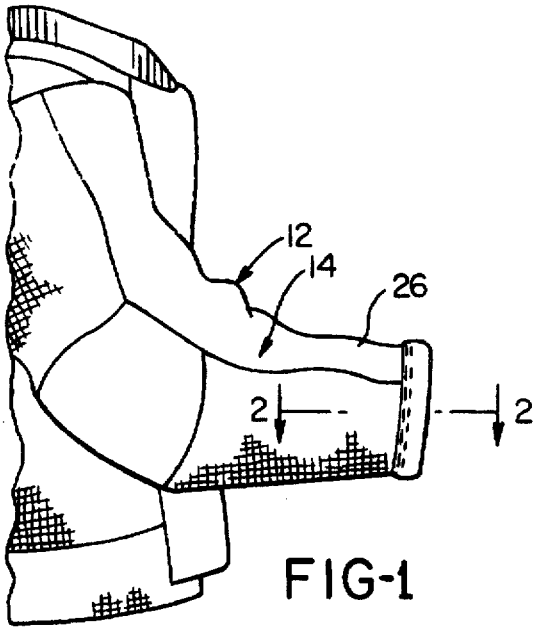
FIG. 1 is a partial side elevation of a firefighter coat embodying the reservoir cuff of the present invention.
Figure 2:
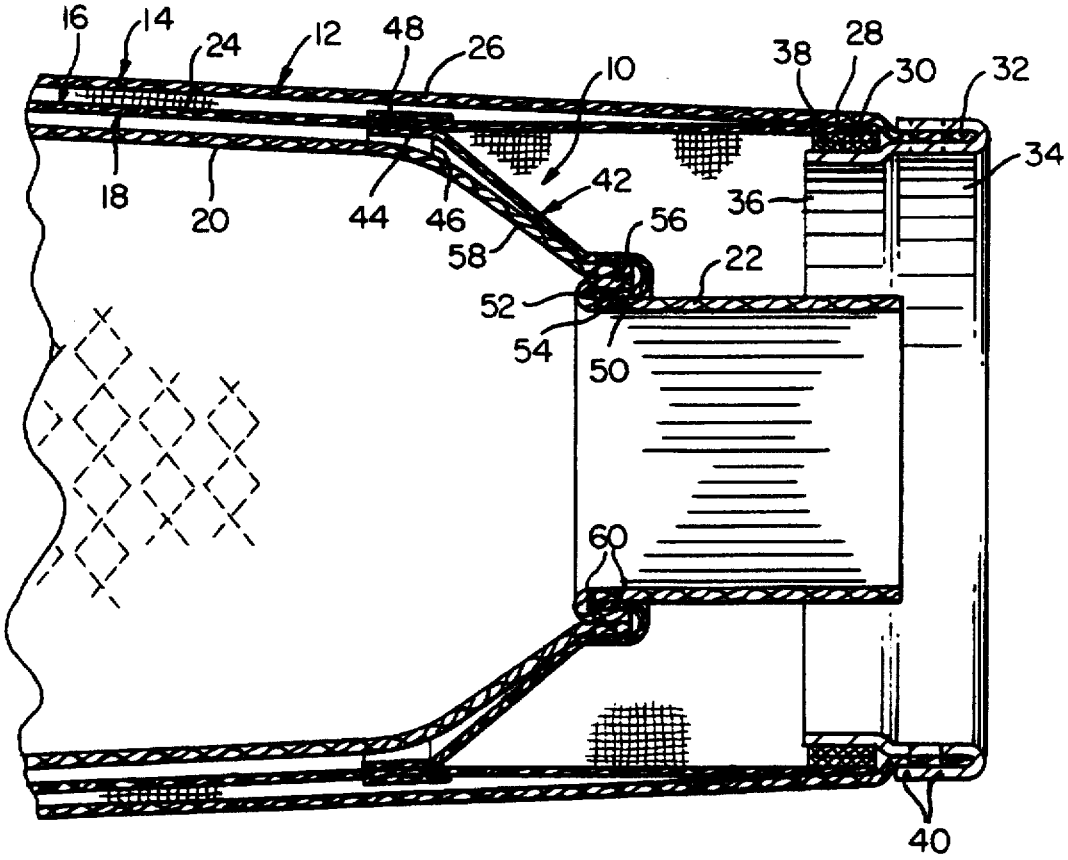
FIG. 2 is a side elevation in section taken at line 2—2 of FIG. 1.

As shown in FIGS. 1 and 2, the reservoir cuff of the present invention, generally designated 10, is incorporated in a firefighter coat 12 of the type having an outer shell 14 of a tightly woven KEVLAR or NOMEX material, and a removable inner liner 16 which is substantially coextensive with the shell. The inner liner 16 includes a moisture barrier 18, preferably made of GORE-TEX, and a thermal barrier 20. The thermal barrier 20 preferably is made of a felt or batting of an aramid fiber such as NOMEX or KEVLAR. It should be noted that the coat 12 includes cuffs 10 in each of its sleeves. However, the following discussion will be directed to the single coat sleeve shown in the figures, it being understood that the description applies equally to the sleeve and cuff not illustrated.

The thermal barrier 20 includes a cuff element 22 which projects outwardly beyond the end of the thermal barrier 20. The cuff element 22 preferably is a ribbed knit of shell material which is sized to engage the wrist of the wearer of the coat 12 and prevent liquid moisture from flowing between the cuff element and the wrist of the wearer.

The moisture barrier 18 includes a moisture barrier sleeve 24 which is coextensive with the outer shell sleeve 26 of the outer shell 14. The end 28 of the moisture barrier sleeve 24 includes an annular strip of one component 30 of hook and loop material. The end 32 of the outer shell sleeve 26 is enclosed by a hem 34 which includes an inwardly-extending lip 36 that carries on its radially outer surface a complementary component 38 of hook and loop material. The complementary component 38 is positioned to engage the component 30 of the moisture barrier sleeve 24 in a removable connection. The hem 34 preferably is made of an abrasion-resistant material, such as leather, and is permanently attached to the end 32 of the shell sleeve by stitches 40.

The reservoir cuff 10 includes a reservoir member 42 which is annular in shape and is made of moisture barrier material. The reservoir member 42 is attached at its outer periphery 44 to the moisture barrier sleeve 24 by stitches 46. The stitched attachment is sealed by tape 48.

The radially inner periphery 50 of the reservoir member is inserted in a slot 52 formed by the folded-over end 54 of the cuff element 22. The inner end 54 is attached to the outer end 56 of the thermal barrier sleeve 58.

The outer end 56 of the thermal barrier sleeve 58, inner end 50 of the reservoir member 42 and inner end 54 of cuff 22 are held together by stitches 60. Because the inner end 50 of the reservoir member 42 is stitched within the slot 52 formed by the inner end 54 of the cuff 22, it encloses the seam between the sleeve 58 and cuff 22 and therefore prevents liquid moisture from flowing between that connection.

Figure 3:
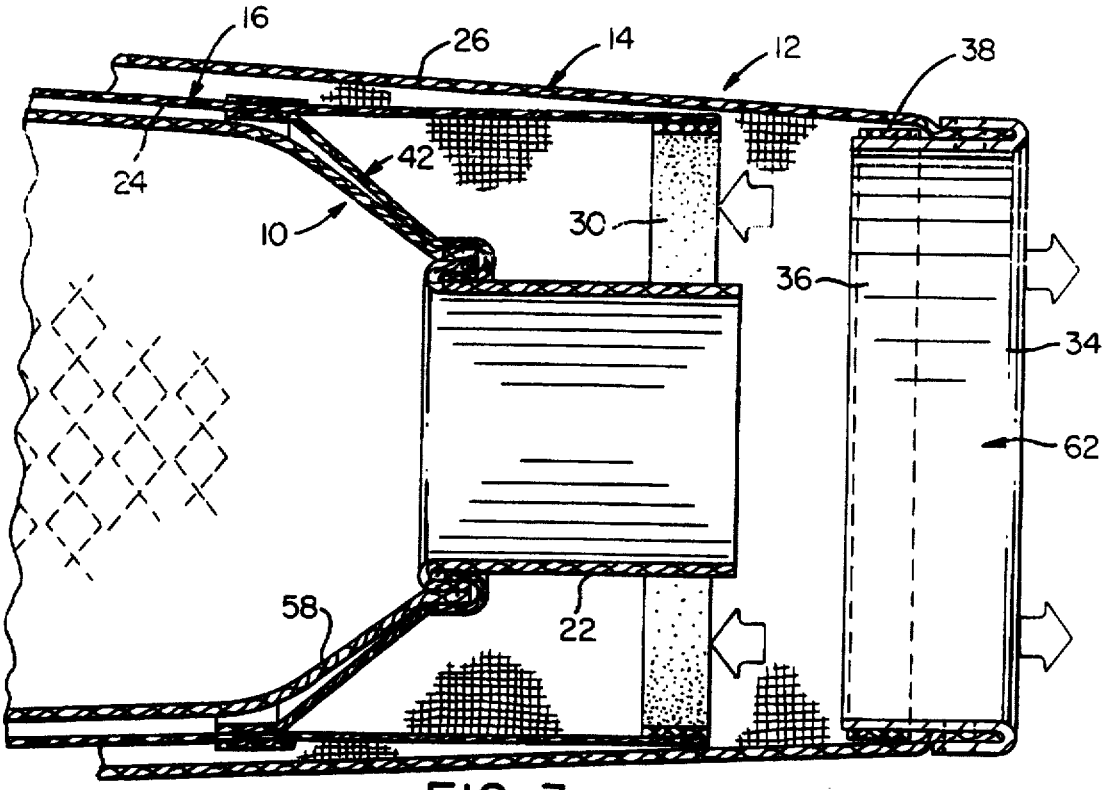
FIG. 3 is a side elevation in section of the view of FIG. 2, in which the inner liner has been separated from the outer shell.

As shown in FIG. 3, the inner liner 16 is separable from the outer shell 14 by detachment of the hook and loop component 30 on the moisture barrier sleeve 24 from the complementary component 38 on the lip 36 of the hem 34 attached to the outer shell sleeve 26. Consequently, the reservoir member 42 is able to be permanently attached to both the moisture barrier sleeve 24 and cuff 22 and moisture barrier sleeve 58 by connections which are superior to temporary or removable connections. The only removable connection required of the cuff 10—hook and loop components 30, 38—is covered by the lip 36 of the hem 34 and the amount of liquid moisture flowing into the coat 12 through the sleeve opening 62 and between the moisture barrier sleeve 24 and outer shell sleeve 26 would be negligible. Accordingly, assembly of the cuff 10 is effected when the liner 16 is inserted into the shell 14 and the moisture barrier sleeves 24 are attached tot he hems 34 of the shell.

Figure 4:
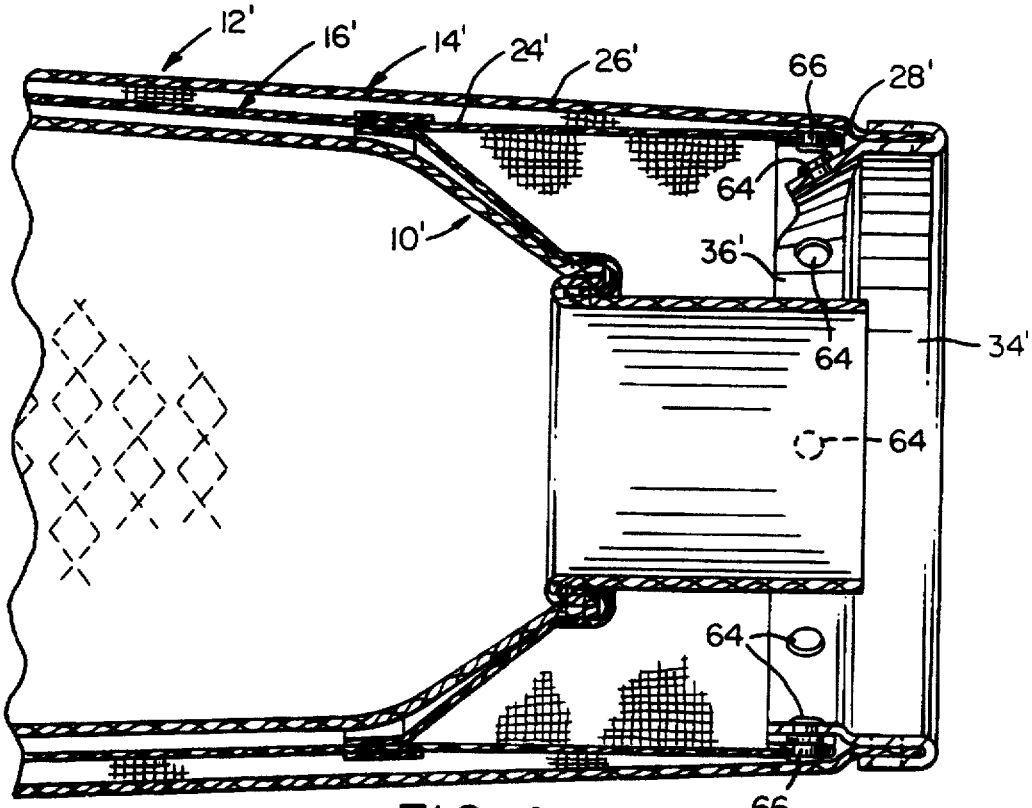
FIG. 4 is a side elevation, similar to that of FIG. 2, but showing an alternate embodiment of the invention.

As shown in FIG. 4, in an alternate embodiment of the cuff 10' the hem 34' includes a lip 36' which carries a plurality of female fastener components 64. The end 28' of the moisture barrier sleeve 24' includes male snap components 66 positioned to engage the female snap components 64 on the lip 36'. In this embodiment, the end 28' is folded over on itself to provide increased thickness of material to minimize tearing through of the male snap components 66.

Attachment of the inner liner 16' to the outer shell 14' is effected similarly to that of the embodiments of FIGS. 1–3. Specifically, the inner liner 16' is inserted in the coat 12' and the ends 28' of the moisture barrier sleeves 24' are positioned within the lips 36' of the hem 34 of the shell sleeves 26' and the components 64, 66 of the snaps are aligned in registry with one another. The snaps are then joined together to effect the connection.

While the forms of apparatus herein described constitute preferred embodiments of the invention, it is to be understood that the invention is not limited to these precise forms of apparatus, and that changes may be made therein without departing from the scope of the invention.

What is claimed is:

1. In a firefighter coat having an outer shell, a moisture barrier and a thermal barrier, a reservoir cuff comprising:

an outer shell sleeve;

a thermal barrier sleeve extending within said outer shell sleeve; and a moisture barrier sleeve, positioned between said outer shell sleeve and said thermal barrier sleeve and attached at an outer end to said outer shell, said moisture barrier sleeve including a reservoir member attached to said thermal barrier sleeve, whereby said reservoir member prevents liquid *which has entered through a sleeve opening in the firefighter coat* from flowing between said thermal barrier sleeve and said moisture barrier sleeve, and attachment between said moisture barrier sleeve and said outer shell sleeve prevents liquid *which has entered through a sleeve opening in the firefighter coat* from flowing between said moisture barrier sleeve and said outer shell sleeve at said outer end.

2. The coat of claim 1 wherein said reservoir member is permanently attached to said moisture barrier sleeve by a waterproof connection.

3. The coat of claim 2 wherein said moisture barrier is removably attached to said outer shell sleeve.

4. The coat of claim 3 wherein said outer shell sleeve includes a hem, said hem having an inner, peripheral lip, and said outer end of said moisture barrier sleeve engages said lip.

5. The coat of claim 4 wherein said engagement between said moisture barrier sleeve and said lip includes a hook and loop fastener connection.

6. The coat of claim 4 wherein said engagement between said moisture barrier sleeve and said lip includes a plurality of snaps space about said hem.

7. The coat of claim 4 wherein said thermal barrier sleeve includes a cuff element extending outwardly from an end thereof, and said reservoir member is attached to said thermal barrier sleeve adjacent to said cuff element.

8. The coat of claim 7 wherein said cuff element and said reservoir member are attached to said thermal barrier sleeve at a common, waterproof connection.

9. The coat of claim 8 wherein said cuff element extends to said hem.

10. The coat of claim 4 wherein said lip overlaps an outer end of said moisture barrier sleeve.

11. The coat of claim 1 wherein said reservoir member is attached to said moisture barrier sleeve at a location spaced from an end of said moisture barrier sleeve.

12. In a firefighter coat having an outer shell, a moisture barrier and a thermal barrier, a reservoir cuff comprising:

an outer shell sleeve having a peripheral hem at an outer end thereof, said hem including a peripheral lip having a fastener component;

a thermal barrier sleeve extending within said shell sleeve and including a cuff element extending outwardly therefrom; and a moisture barrier sleeve, positioned between said outer shell sleeve and said thermal barrier sleeve and including a complementary fastener component at an outer end thereof removably attachable to said fastener component beneath said lip; and said moisture barrier sleeve including an annular reservoir member permanently attached to said moisture barrier sleeve at a radially-outer end by a waterproof seal, and said reservoir member permanently attached to said thermal barrier sleeve at a seam between said thermal barrier sleeve and said cuff element by a waterproof seal.

*13. In a firefighter coat having an outer shell, a moisture barrier positioned within said outer shell and a thermal barrier positioned within said moisture barrier, a reservoir cuff comprising:*

*an outer shell sleeve;*

*a thermal barrier sleeve extending within said outer shell sleeve; and*

*a moisture barrier sleeve positioned between said outer shell sleeve and said thermal barrier sleeve and attached to said thermal barrier sleeve, said moisture barrier sleeve having a segment attached to said outer shell sleeve, whereby attachment between said moisture barrier sleeve and said thermal barrier sleeve prevents liquid which has entered through a sleeve opening in the firefighter coat from flowing between said thermal barrier sleeve and said moisture barrier sleeve, and attachment between said moisture barrier sleeve segment and said outer shell sleeve prevents liquid which has entered through a sleeve opening in the firefighter coat from flowing between said moisture barrier sleeve and said outer shell sleeve at said outer end.*

*14. The coat of claim 13 wherein said moisture barrier sleeve is removably attached to said outer shell sleeve.*

*15. The coat of claim 14 wherein engagement between said moisture barrier sleeve and said outer shell sleeve includes a hook and loop fastener connection.*

* * * * *